(12) United States Patent
Suter et al.

(10) Patent No.: US 7,363,937 B2
(45) Date of Patent: Apr. 29, 2008

(54) REPLACEABLE SLEEVE INSERT FOR A CHOKE ASSEMBLY

(75) Inventors: Roger Suter, Katy, TX (US); Burkhard Alan, Houston, TX (US)

(73) Assignee: M-I L.L.C., Houston, TX (US)

( * ) Notice: Subject to any disclaimer, the term of this patent is extended or adjusted under 35 U.S.C. 154(b) by 196 days.

(21) Appl. No.: 10/892,576

(22) Filed: Jul. 16, 2004

(65) Prior Publication Data

US 2006/0011236 A1    Jan. 19, 2006

(51) Int. Cl.
*F16K 5/02*    (2006.01)

(52) U.S. Cl. .................... 137/375; 251/63; 251/324; 137/454.6

(58) Field of Classification Search ............... 137/375, 137/454.6; 251/63, 324
See application file for complete search history.

(56) References Cited

U.S. PATENT DOCUMENTS

| | | | |
|---|---|---|---|
| 2,792,845 A | | 5/1957 | Atherton et al. |
| 3,902,521 A | * | 9/1975 | Keller et al. ............... 137/375 |
| 4,337,788 A | | 7/1982 | Seger |
| 4,355,784 A | * | 10/1982 | Cain .......................... 251/63 |
| 4,365,646 A | * | 12/1982 | Sandling ..................... 137/375 |
| 4,469,123 A | * | 9/1984 | Merrill ................... 137/315.11 |
| 4,503,878 A | | 3/1985 | Taylor |
| 5,133,383 A | * | 7/1992 | King ....................... 137/625.3 |

OTHER PUBLICATIONS

International Search Report issued Nov. 16, 2006 for PCT/US2005/023120, filed Jun. 30, 2005.

* cited by examiner

Primary Examiner—Ramesh Kirshnamurthy
Assistant Examiner—Cloud Lee

(57) ABSTRACT

A replaceable sleeve insert for a choke assembly is disclosed, wherein the replaceable sleeve insert has a tubular member coaxially and sealingly retained within an upper body section of the choke assembly. The tubular member is also sealed against the bonnet. The tubular member has an inner diameter sufficient to accommodate coaxial linear displacement of a shuttle assembly and an outer diameter sufficient to fit within an upper body orifice in the upper body section. At least one attachment member outwardly extends from the tubular member and is retained between the upper body section and the bonnet. The tubular member has an opening in the sleeve wall to provide fluid communication from the choke inlet to the interior of the tubular member. A method of assembling a choke with a replaceable sleeve insert is also described.

16 Claims, 8 Drawing Sheets

REPLACEABLE SLEEVE INSERT FOR A CHOKE ASSEMBLY

BACKGROUND OF INVENTION

Choke assemblies are used to help regulate the pressure within a well as it is being drilled and stimulated. During such drilling, and particularly during stimulation, high pressure gases and drilling fluids may be propelled through the choke assembly, bringing sand and other debris which erode the interior of the choke assembly.

Typically, choke assemblies have a side inlet channel that feeds fluid into an upper body section of the choke. Within the upper body section, the flow is redirected through an upper body orifice to an end discharge channel. A shuttle assembly is retained by a bonnet located at the end of the upper body section opposite the end discharge channel. The shuttle assembly has a shuttle that may be selectively positioned to regulate the pressure of the flow through the upper body orifice. The selective positioning includes a seated position in which the flow is stopped prior to entering the end discharge channel.

Due to the high velocities of the flow through the choke assembly, sand and other debris that are carried with the flow quickly erode the interior of the upper body section of the choke assembly. Prior art attempts to protect the upper body section from excessive wear include long tubular projections from the bonnet of the choke assembly into the upper body section. While this technique provided some protection from damage to the upper body section, damage to the tubular projection would require replacement of the entire bonnet.

Another prior art method of protecting the upper body section of a choke assembly utilizes a type of sleeve insert wherein the entire sleeve fits within the upper body orifice of the upper body section to be protected. Such sleeve inserts have proven difficult to remove. As particles and drilling fluid accumulate in the small space between the upper body section wall and the outer surface of the wall, the sleeve becomes wedged within the upper body section. Because the entire sleeve is retained within the valve body it is difficult to grasp and remove the sleeve after wear due to erosion has been detected. It would be an improvement to the art to have a sleeve insert that is easier to remove and replace after sufficient wear on the component has been identified.

SUMMARY

The claimed replaceable sleeve insert includes a tubular member with at least one attachment member extending from a first end. The tubular member has an outer diameter sufficient to fit within the upper body section of the choke assembly and an inner diameter providing sufficient clearance for coaxial linear displacement of a slidable shuttle assembly. The attachment member, or members, is secured between the choke body and a bonnet such that a trim gap is provided between the second end of the tubular member and a shoulder formed between the upper body section and the end discharge channel. An opening in the tubular member aligns with the side inlet channel of the choke assembly providing fluid communication from the side inlet channel into the upper body section.

Also inclusive with the present invention is a method of assembling a choke assembly wherein the inventive sleeve is inserted into an upper body orifice until the attachment member is resting on the upper body section of the choke assembly. The opening in the tubular member is aligned with the side inlet channel. A shuttle assembly and a bonnet are assembled and the bonnet is placed over the top of the upper body section so that the shuttle is located within the sleeve insert. The bonnet is then secured to the upper body section.

Other aspects and advantages of the claimed subject matter will be apparent from the following description and the appended claims.

DETAILED DESCRIPTION

Figure 1:
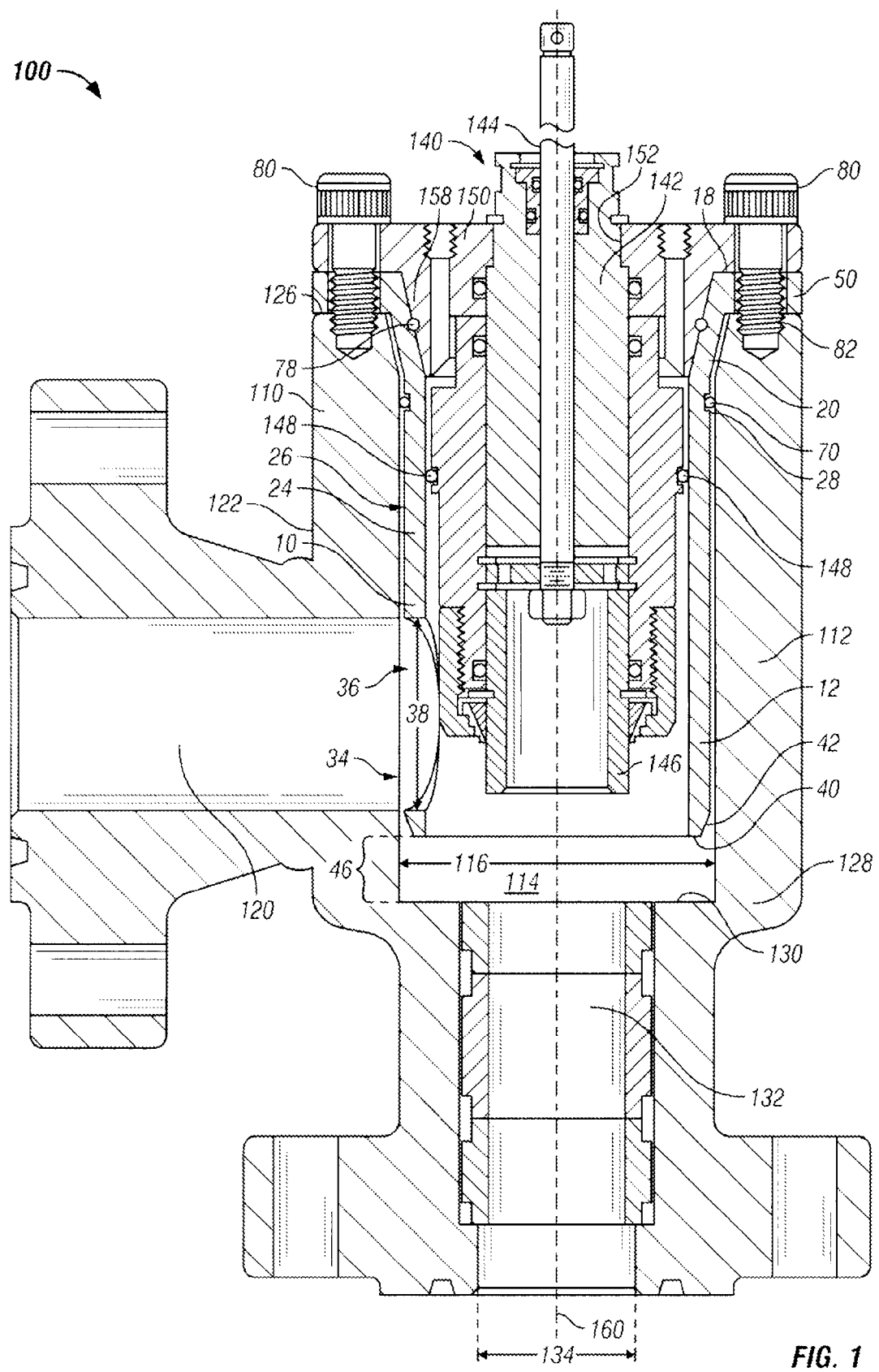
FIG. 1 is a cross sectional view of a choke assembly including an embodiment of a replaceable sleeve insert.

Referring to FIG. 1, a replaceable sleeve insert 10 is depicted within a choke assembly 100. The choke assembly 100 includes a choke body 110, a shuttle subassembly 140, and a bonnet 150.

The choke body 110 includes an upper body section 112, a side inlet channel 120, and an end discharge channel 132. An upper body orifice 114 extends through the length of the upper body section 112. The end discharge channel 132 adjoins upper body orifice 114 at an upper body second end 128 in coaxial alignment about a center axis 160. The end discharge channel 132 has a discharge diameter 134, which may be smaller than the upper body orifice diameter 116, thereby forming a shoulder 130 at the upper body second end 128. When present, a trim device (not shown) and valve seat (not shown) may be seated on the shoulder 130. The side inlet channel 120 feeds into a side 122 of the upper body orifice 114 between an upper body first end 126 and the upper body second end 128.

The bonnet 150 is secured over the upper body first end 126, distal the end discharge channel 132. A mandrel 142 extends from the bonnet 150 into the upper body orifice 114. A mandrel orifice 152 extends through the bonnet 150 and integrated mandrel 142. A tubular protrusion 158 coaxially located around the integrated mandrel 142 may also extend into the upper body orifice 114. The mandrel orifice 152 and the tubular protrusion 158 are coaxially located about the center axis 160.

The shuttle subassembly 140 includes a shuttle 146 and a rod 144. The rod 144 is slidably retained within the mandrel orifice 152. The cylindrical shuttle 146 is attached to the rod 144 within the upper body orifice 114 and moves over the mandrel 142 to be linearly displaced within the upper body orifice 114. The shuttle 146 may be selectively positioned within the upper body orifice 114, including positioned to close against a valve seat (not shown) near the end discharge channel 132, thereby stopping fluid flow between side inlet channel 120 and end discharge channel 132.

Figure 2:
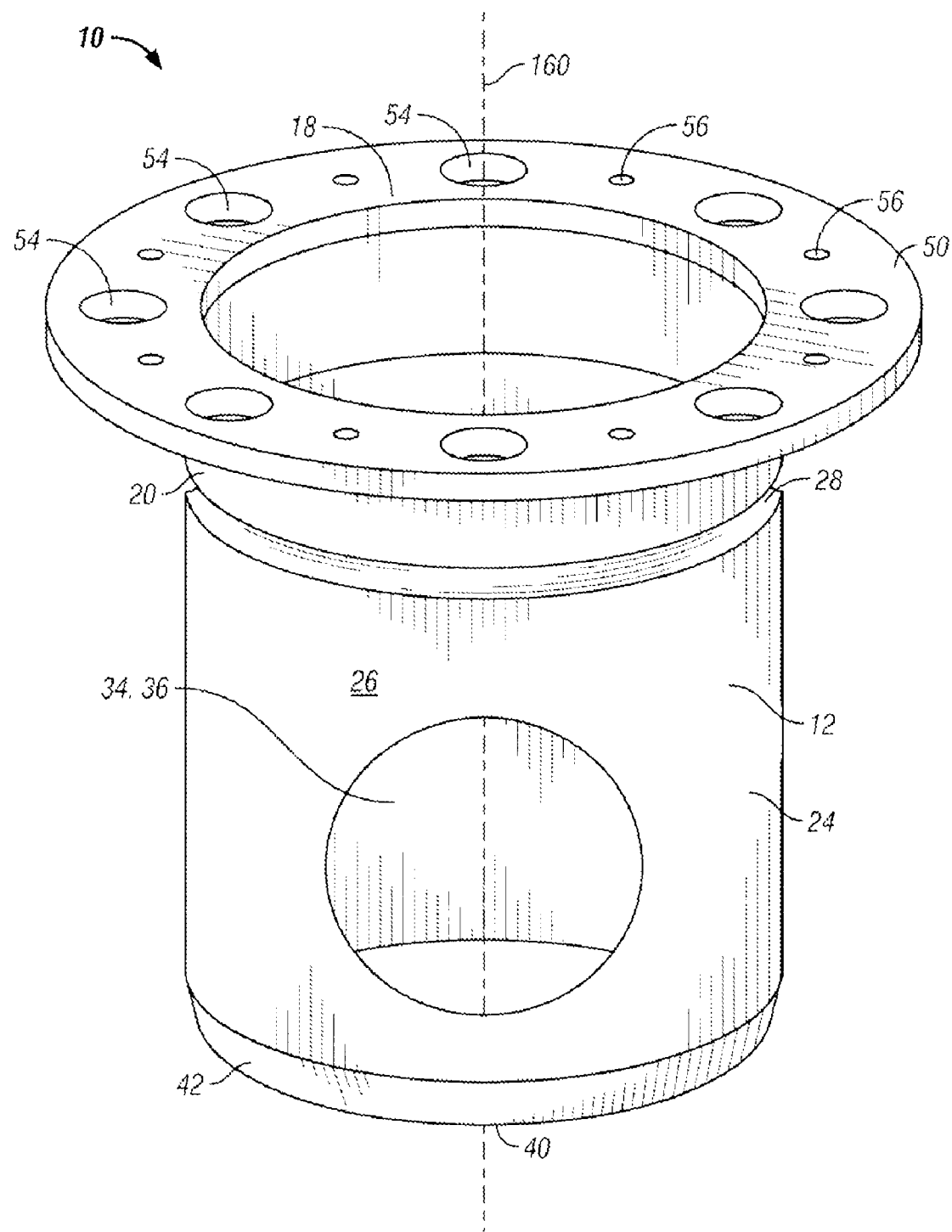
FIG. 2 is a perspective view of an embodiment of the replaceable sleeve insert.
Figure 3A:
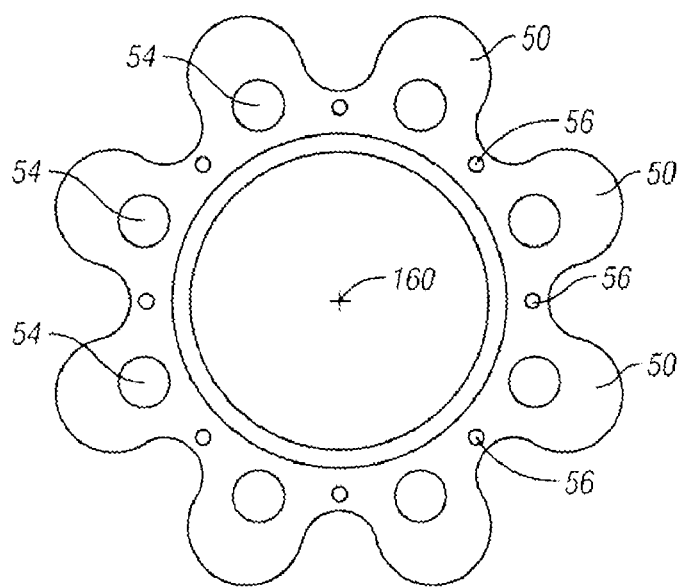
FIGS. 3a through 3e are top views of alternative embodiments of the attachment members of the replaceable sleeve insert.
Figure 3B:
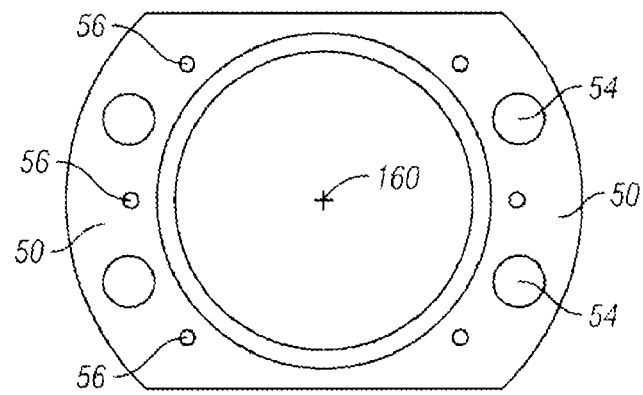
Figure 3C:
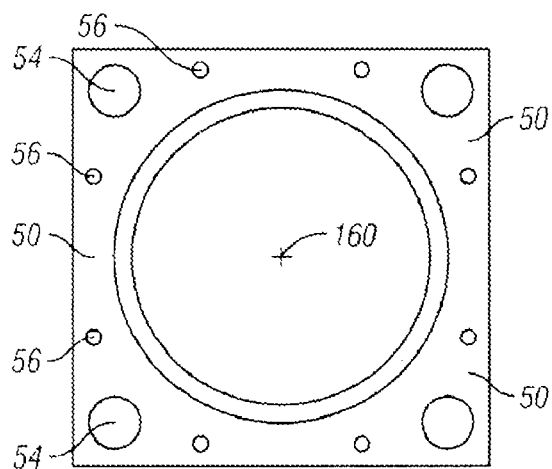
Figure 3D:
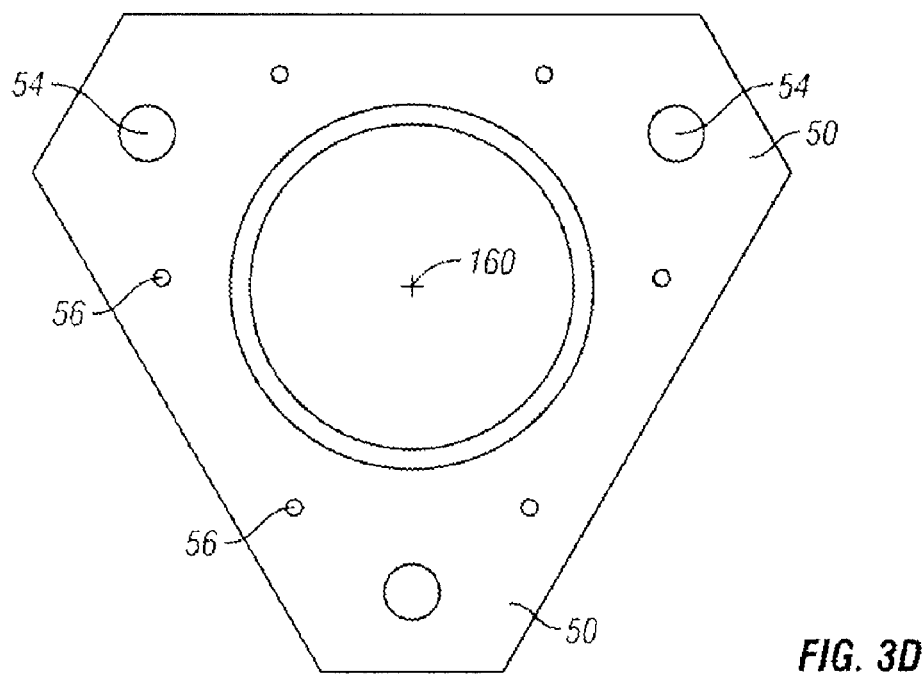
Figure 3E:
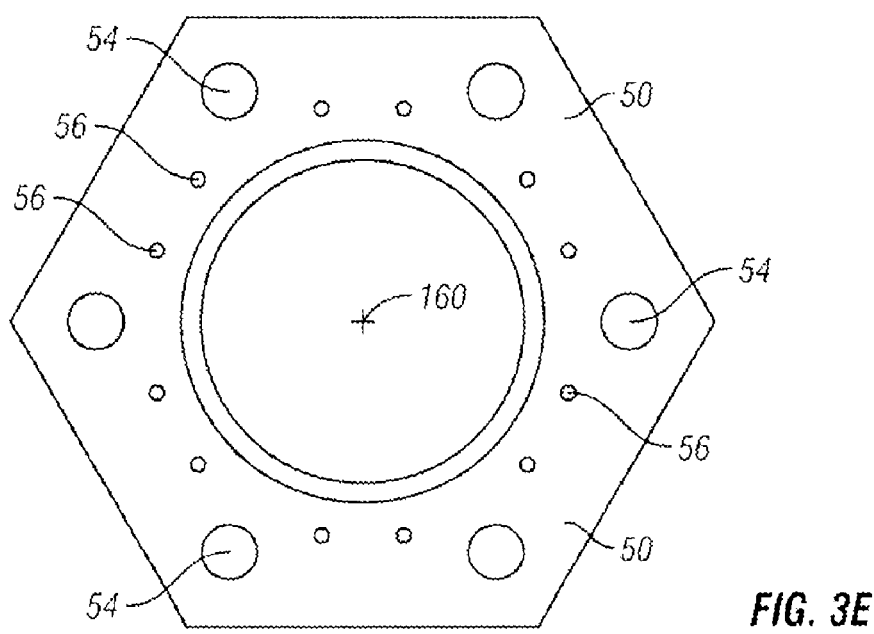
Figure 6:
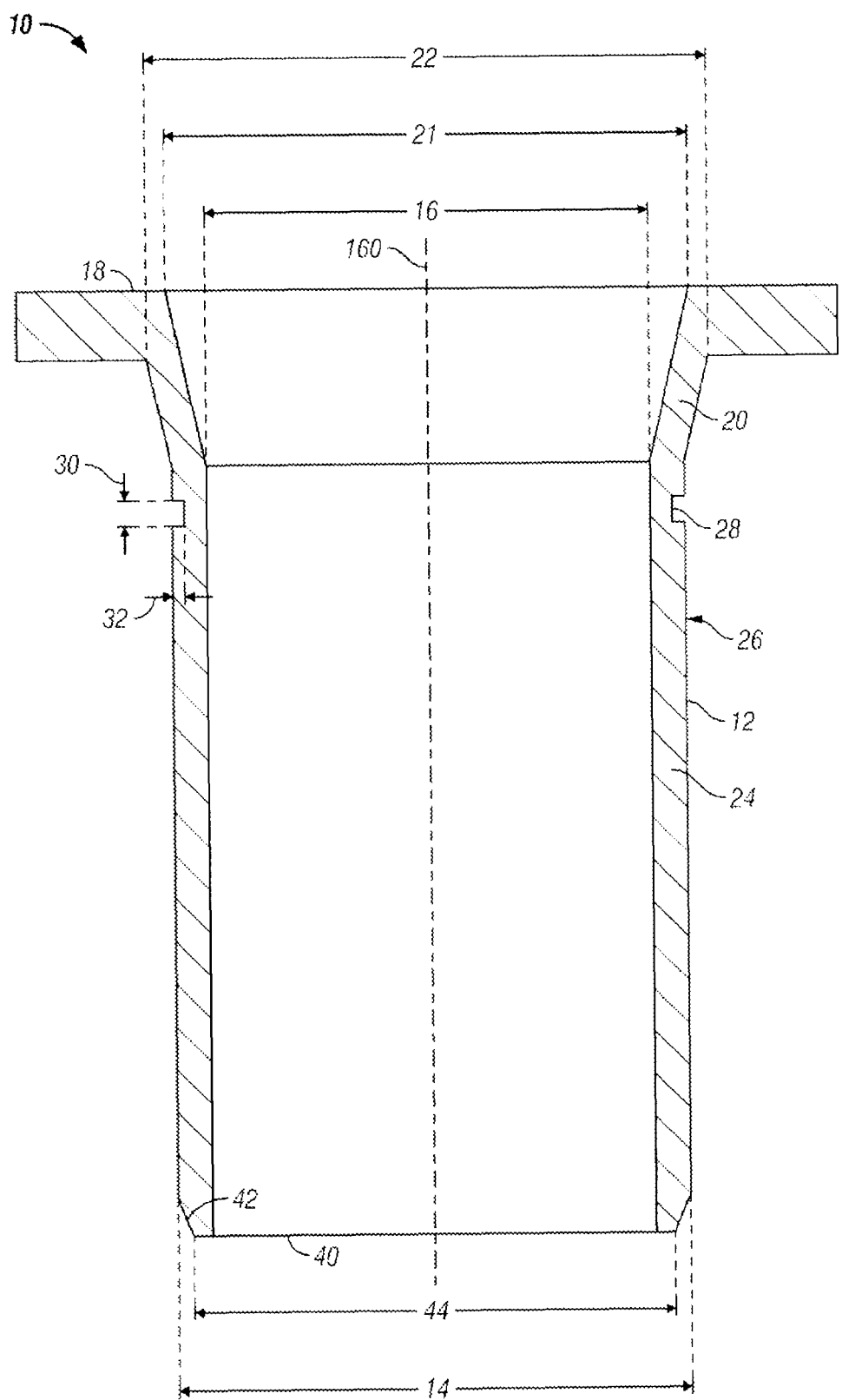
FIG. 6 is a cut away side view of the preferred embodiment of the sleeve insert.

Referring to FIGS. 1, 2, and 6 the replaceable sleeve insert 10 includes a tubular member 12 and at least one attachment member 50. The tubular member 12 has an outer diameter 14 sufficient to fit within the upper body orifice 114 and is coaxially located about the center axis 160 within the upper body section 112. The tubular member 12 has an inner diameter 16 sufficient to accommodate the linear displacement of the shuttle 146. The shuttle 146 and the tubular member 12 have a dynamically sealed interface.

A first end 18 of the tubular member 12 is located near the bonnet 150 and a second end 40 of the tubular member 12 is located near the end discharge channel 132. A sleeve wall 24 extends between the first end 18 the second end 40 and has an outer face 26, which is adjacent to the upper body orifice 114 when the sleeve insert 10 is placed therein.

To facilitate insertion and removal of the sleeve insert 10, the tubular member 12 includes a tapered section 42 around the sleeve wall 24 from a point upstream of the second end 40 to the second end 40. The taper of tapered section 42 results in a second end diameter 44 that is less than the outer diameter 14 of that portion of the tubular member 12 that is adjacent to the tapered section 42 distal the second end 40.

Figure 4:
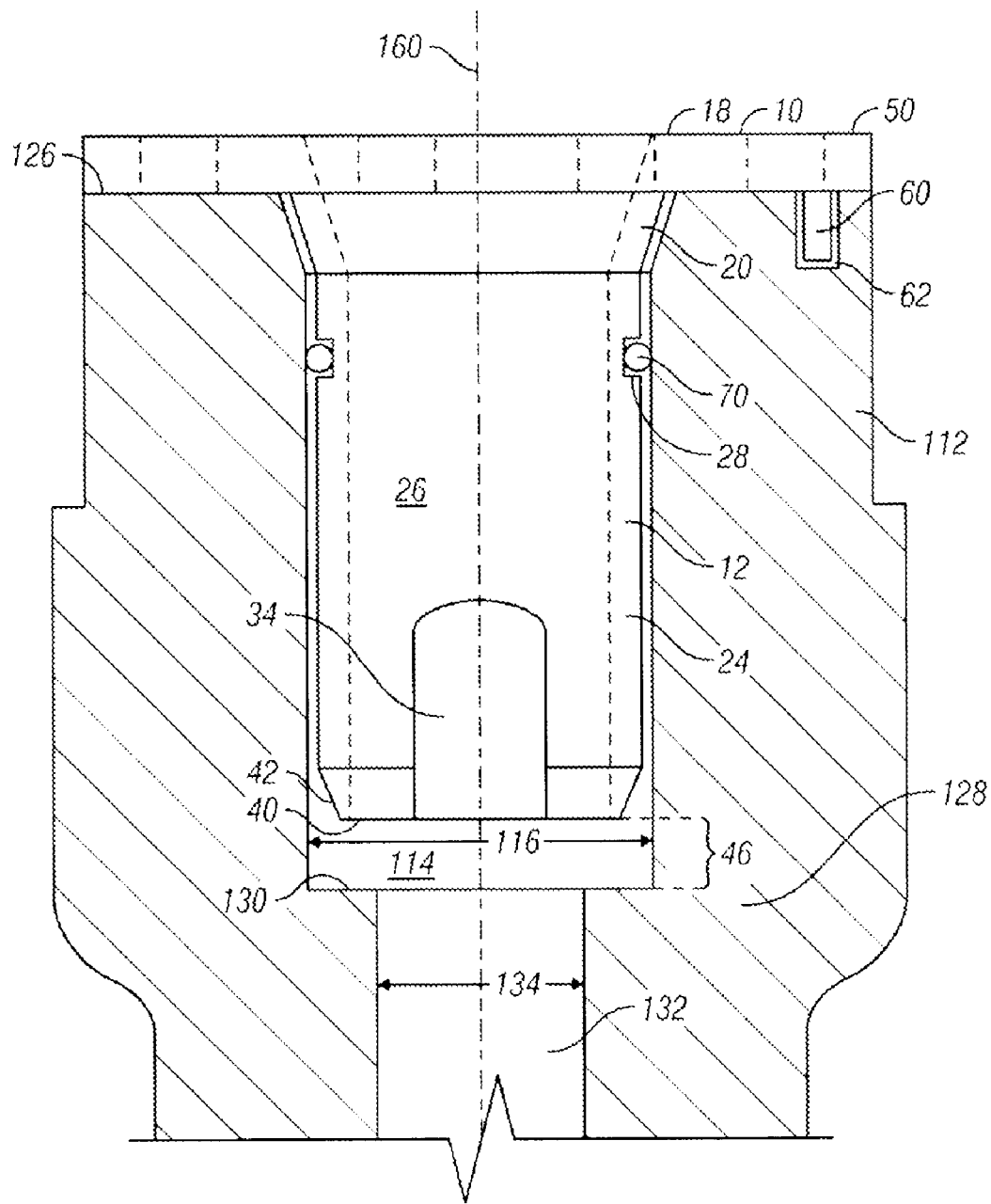
FIG. 4 is a side view of an alternative embodiment of the replaceable sleeve insert in the cutaway view of the upper body orifice.

Referring to FIGS. 1, 2, and 4, the tubular member 12 has an opening 34 therein to receive fluid from the side inlet channel 120. To maintain such fluid communication, the opening 34 must remain aligned with the side inlet channel 120. The opening 34 may be an orifice 36 through the sleeve wall 24, wherein the orifice has an orifice diameter 38 sufficient to receive fluid from the side inlet channel 120. Alternatively, as depicted in FIG. 4, the opening 34 may be of any shape of cutaway in the tubular member 12, so long as continuity is maintained with the side inlet channel 120.

Referring again to FIGS. 1, 2, and 6, the tubular member 12 is sealingly retained between the upper body section 112 and the bonnet 150. The outer face 26 may include a circumferential groove 28 having a groove width 30 and a groove depth 32 sufficient to accommodate a first sealing ring 70. Alternatively, as depicted in FIG. 5, the upper body orifice 114 may have an annular groove 72 having an annular groove width 74 and an annular groove depth 76 sufficient to accommodate the first sealing ring 70.

Figure 5:
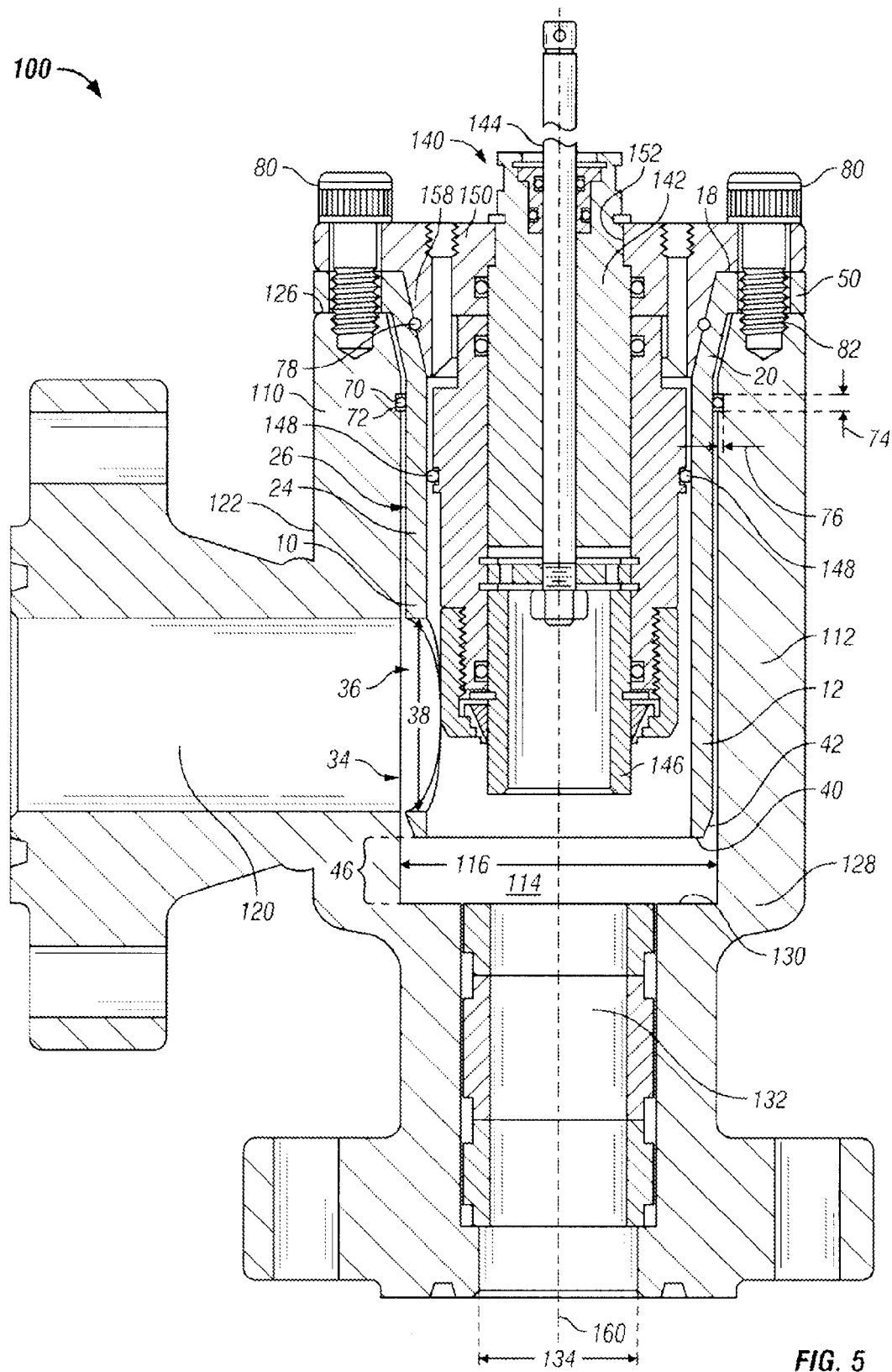
FIG. 5 is a cut away side view of an alternative embodiment of the replaceable sleeve insert.
Figure 7:
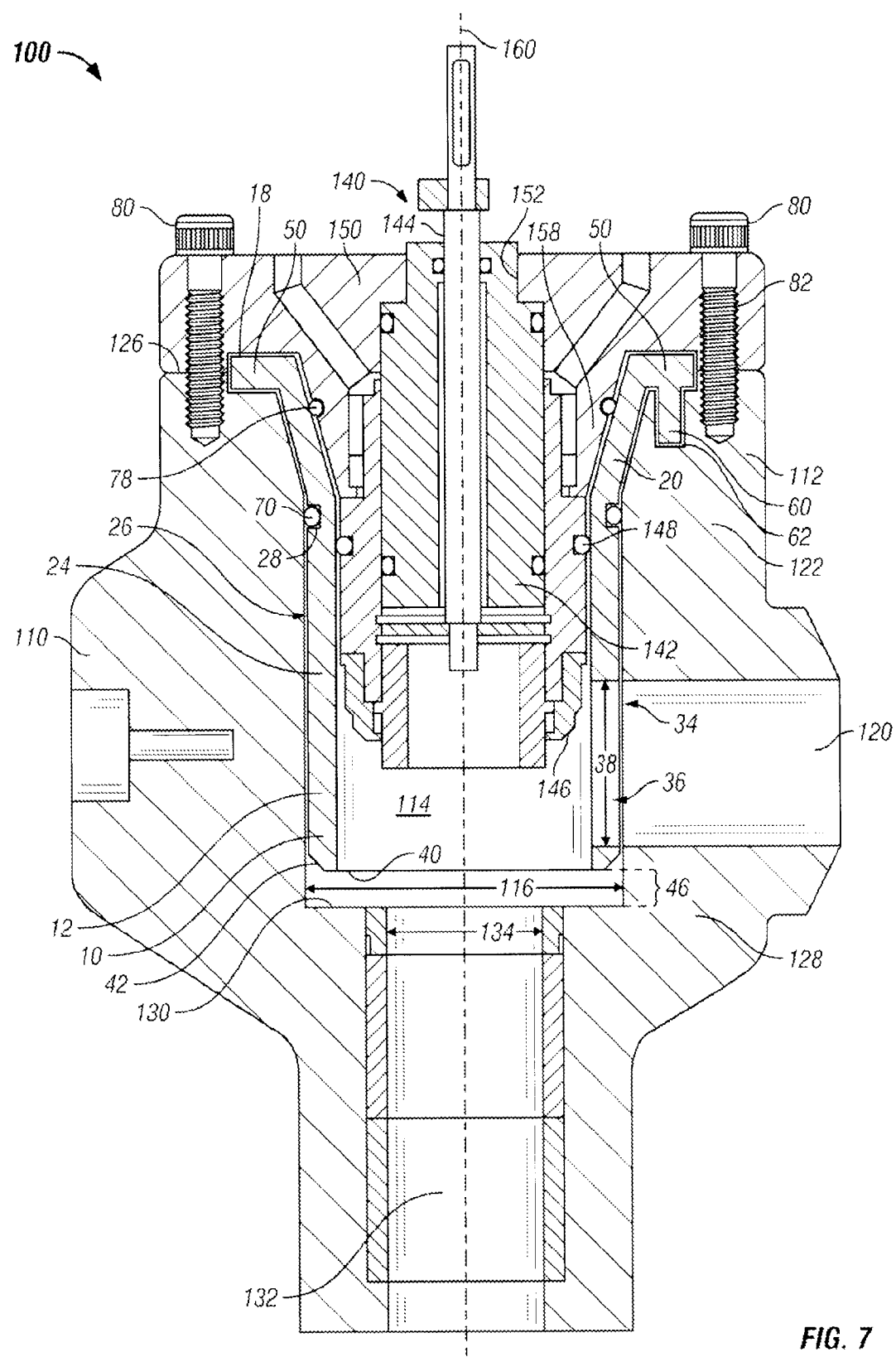
FIG. 7 is a cross sectional view of a choke assembly including an alternative embodiment of the replaceable sleeve insert.

The bonnet 150, as depicted in FIGS. 1, 5, and 7, includes a tubular protrusion 158 having a groove with a second sealing ring 78 therein. Alternatively, the tubular member 12 could include a groove (not shown) to accommodate the second sealing ring. Conceivably, the second sealing ring 78 could be located anywhere along the interface of the bonnet 150 and the sleeve insert 10 so long as the integrity of the seal is maintained. That is, no orifices or gaps between the second sealing ring 78 and the area of high pressure within the tubular member 12 to which fluid could be directed should exist.

Referring to FIGS. 1, 3a-3e, and 4, each attachment member 50 extends outward from the first end 18 of tubular member 12 and is secured between the upper body section 112 and the bonnet 150. One or more attachment holes 54 may be located through each attachment member 50 through which fastener shafts 82 may be placed to secure the bonnet 150 to the upper body section 112 and to prevent rotation of the sleeve insert 10 within upper body orifice 114. Once secured, the sleeve insert 10 is held by the attachment member 50 and the tubular member 12 is retained such that a trim gap 46 is present between the second end 40 and the shoulder 130, if present, at the end discharge channel 132. A trim device (not shown) may be placed on the shoulder 130, but a trim gap 46 between second end 40 and the trim device should be present. The presence of the trim gap 46 ensures the sleeve insert 10 is resting on the attachment members 50.

As shown in FIGS. 2 and 3a-e, one or more removal holes 56 may be located through at least one of the attachment members 50. The removal holes 56 should be positioned over a flat area of the upper body section 112 and may be tapped. A threaded article (not shown) may then be lowered through the removal hole 56 until the flat surface of the upper body section 112 is reached. Continued lowering of the threaded article serves to pull the attachment member 50 out from the upper body section 112 by pushing the attachment member 50 away from the upper body section 112.

Referring to FIG. 7, in one embodiment of the sleeve insert 10, the attachment members 50 do not extend to the outer periphery of the bonnet 150 and upper body section 112. As the attachment members 50 do not extend beyond the location of the fasteners 80, attachment holes 54 are not included. To help prevent internal rotation of the sleeve insert 10 one of the attachment members 50 may include an orienting pin 60 which extends from the attachment member 50 into a receptacle on the upper body section 112. The orienting pin further ensures proper alignment of the sleeve insert 10 with the side inlet channel 120. The upper body section 112 includes a corresponding alignment receptacle 62 of sufficient size to receive the alignment pin 60 and properly located to align opening 34 with side inlet channel 120. As shown in FIG. 4, an orienting pin 60 and alignment receptacle 62 may also be included on the attachment members 50 which extend beyond fasteners 80.

The attachment member 50 of the sleeve insert embodiment depicted in FIGS. 1 and 2 is a radially extending flange. Referring to FIGS. 3a through 3e, it is contemplated that other attachment member configurations may be used, including, but not limited to, multiple outwardly extending attachment members 50, each having one or more attachment holes 54.

Referring to FIGS. 1 and 6, to provide strength to area of the replaceable sleeve 10 where the attachment member 50 adjoins the tubular member 12, the tubular member 12 may include a frustoconical section 20 immediately adjacent to the first end 18. When the frustoconical section 20 is included, the first end outer diameter 22 is greater than the outer diameter 14 of the portion of the tubular member 12 adjacent to the frustoconical section 30 distal the first end 18. Further, the first end inner diameter 21 of the tubular member 12 (shown in FIG. 4) is greater than the inner diameter 16 of the portion of the tubular member 12 adjacent to the frustoconical section 30 distal the first end 18. Thus, the upper body orifice 114 and any facing portion of the bonnet 150 must have a matching profile to accommodate the frustoconical section 20 when it is included.

The sleeve insert 10 may be made from a hardened, erosion resistant material, such as hardened steel. A mild steel, such as stainless is also sufficient. It is also conceivable that a ceramic material or composite alloy material may be suitable for forming the sleeve insert 10. Use of alloys that resist erosion, such as tungsten carbide, may be used to form the sleeve insert 10. In addition, a wear-resistant coating 48 (depicted in FIG. 6) may be applied to the tubular member 12 to increase the erosion resistance of the material.

Referring again to FIG. 1, to assemble a choke assembly 100 having a sleeve insert 10, the tubular member 12 of the sleeve insert 10 is inserted into the upper body orifice 114 in the upper body section 112 until the attachment member (or members) 50 rests upon the upper body first end 126. The sleeve insert 10 is then positioned to align the opening 34 in the tubular member 12 with the side inlet channel 120.

The shuttle subassembly 140 is attached to the bonnet 150, which is then placed over the sleeve insert 10 such that the shuttle 146 has a dynamically sealing fit within the tubular member 12 and the bonnet 150 rests on the attachment member (or members) 50. A dynamic seal 148 provides a seal between the shuttle 146 and the tubular member 12. The bonnet 150 and attachment member 50 are secured to the upper body section 112.

To remove the sleeve insert 10 from the upper body orifice 114 after a predetermined amount of erosion is observed or a predetermined period of use has transpired, the removal holes 56 may be used to separate the attachment member 50 from the upper body first end 126 and lift the sleeve insert 10 out of the upper body orifice 114. Additionally, or alternatively, the attachment member 50 may be pried from the upper body second end 114. Certain attachment member 50 configurations may be conducive to the use of a tool (not shown) to apply rotational force to the sleeve insert 10 about the center axis 160 to further aid in the removal of the sleeve insert 10. However, such rotational force would not be beneficial for sleeve inserts 10 including an orienting pin 60 (shown in FIG. 4) until the sleeve insert 10 has been lifted sufficiently from the upper body first end 126 for the orienting pin 60 to be completely clear of the corresponding alignment receptacle 62.

Referring to FIG. 7, for the embodiment of the sleeve insert 10 wherein the attachment members 50 do not extend beyond the fasteners 80, the bonnet 150 is secured directly to the upper body section 112 with the attachment members 50 secured between the bonnet 150 and the upper body section 112. In this embodiment the orienting pin 60 is included on the attachment member 50 and may be lowered into the corresponding alignment receptacle 62 on the upper body section 112 when the sleeve insert 10 is positioned to align the opening 34 with the side inlet channel 120.

Referring to FIG. 1, for retrofitting a sleeve insert 10 into an existing choke assembly 100, material within the upper body orifice 114 will need to be removed to accommodate the tubular member 12. Thus, the upper body orifice 114 will need to be bored to create an upper body orifice diameter 116 sufficient to accommodate the tubular member 12. Further, material from the bonnet 150 will need to be removed to accommodate the attachment member 50 and maintain the proper relationship between the bonnet 150, shuttle subassembly 140 and valve seat (not shown) so that the choke assembly 100 remains selectively closeable. If material is removed from the upper body section 112 to accommodate the attachment member 50 and fasteners 80 having threaded shanks are used to attach the bonnet 150 to the upper body section 112, it may be necessary to obtain longer threaded fasteners 80 and drill and tap additional length of threaded receptacle to ensure that the bonnet 150 is safely retained on the upper body section 112. Further, the stresses present in the upper body section 112 and the bonnet 150 during operation of the choke assembly 100 must also be evaluated to ensure continued safe operation of the choke assembly 100 after the removal of the material required to accommodate the sleeve insert.

It is understood that variations may be made in the foregoing without departing from the scope of the invention. For example, the present invention is not limited to the processing of drilling fluid in an oil field environment, but is equally applicable to any application involving the control of fluid flow and the protection of surfaces that may be eroded by the fluid flow and debris within the fluid flow.

Since other modifications, changes, and substitutions are intended in the foregoing disclosure, it is appropriate that the appended claims be construed broadly and in a manner consistent with the scope of the invention.

What is claimed is:

1. A sleeve insert for a choke assembly, the choke assembly comprising a choke body having an interior surface, a shuttle subassembly, and a bonnet, the choke body including an upper body section having an upper body orifice within which the shuttle assembly may be linearly displaced, a side inlet channel to the upper body orifice, and an end discharge channel coaxially aligned about a center axis with the upper body orifice and having a discharge diameter, the bonnet retaining the shuttle subassembly and attached to the upper body section distal the end discharge channel, the sleeve insert comprising:

A replaceable tubular member including a first end and a second end, wherein the tubular member protects the interior surface of the choke body from erosion;
   the tubular member sealingly retained between the upper body and the bonnet;
   the tubular member having an inner diameter sufficient to accommodate the linear displacement of the shuttle assembly and an outer diameter sufficient to fit within the upper body orifice;
   at least one attachment member extending outward from the first end of the tubular member;
   the at least one attachment member secured intermediate the upper body and the bonnet;
   the tubular member having an opening therein to receive fluid from the side inlet channel;
   wherein the sleeve insert is selectively removable from the choke assembly;
   wherein the at least one attachment member has a removal hole therethrough, the removal hole positioned over a flat area of the upper body section and including a tapped interior for receiving a threaded article; and
   wherein the threaded article is selectively lowered within the removal hole against the flat area to remove the sleeve insert from the choke body.

2. The insert of claim 1, wherein the at least one attachment member is a flange.

3. The insert of claim 1, wherein the tubular member further comprises:

a sleeve wall extending between the first end and the second end and having an outer face adjacent the upper body orifice;
   the outer face having a circumferential groove therein; and
   the circumferential groove having a groove width and a groove depth sufficient size to accommodate a sealing ring.

4. The insert of claim 3, wherein the opening in the tubular member is an orifice through the sleeve wall having an orifice diameter sufficient to receive fluid from the side inlet channel.

5. The insert of claim 1, wherein the tubular member further comprises;

a tapered section immediately adjacent to the second end of the tubular member providing a second end outer diameter smaller than the outer diameter of the tubular member immediately adjacent the tapered section that is distal the second end.

6. The insert of claim 5, wherein the tubular member further comprises:

a frustoconical section immediately adjacent to the first end of the tubular member providing a first end outer diameter greater than the outer diameter of the tubular member immediately adjacent to the frustoconical section that is distal the first end and a first end inner diameter greater than the inner diameter of the tubular member immediately adjacent to the frustoconical section that is distal the first end; and the frustoconical section fitting within the upper body orifice.

7. The insert of claim 1, further comprising:

an orienting pin extending from at least one of the at least one attachment member; and the upper body first end having an alignment hole therein in a position and of sufficient size to receive the alignment pin.

8. The insert of claim 1, further comprising:

a wear-resistant coating applied to the tubular member.

9. A choke assembly comprising:

a choke body;

a linearly displaceable shuttle subassembly;

a bonnet;

the choke body including an upper body section having an upper body orifice within which the shuttle assembly may be linearly displaced and having an interior surface, a side inlet channel to the upper body orifice, and an end discharge channel coaxially aligned about a center axis with the upper body orifice;

the upper body orifice having an upper body orifice diameter;

the bonnet retaining the shuttle subassembly;

the bonnet attachable to the upper body distal the end discharge channel;

a replaceable sleeve insert protecting the interior surface of the upper body orifice from erosion, the sleeve insert including a tubular member and at least one attachment member;

the tubular member including a first end and a second end;

the tubular member having an outer diameter sufficient to fit within the upper body orifice and an inner diameter sufficient to accommodate the linear displacement of said shuttle subassembly;

the at least one attachment member extending outward from the first end of the tubular member;

the at least one attachment member secured intermediate the upper body and the bonnet;

the tubular member having an opening therein to receive fluid from the side inlet channel;

a first seal ring located between the tubular member and the upper body orifice; and a second seal ring located between the tubular member and the bonnet; and a dynamic seal located between the tubular member and the shuttle subassembly;

wherein the attachment member has a removal hole therethrough, the removal hole positioned over a flat area of the upper body section and including a tapped interior for receiving a threaded article; and wherein the threaded article is selectively lowered within the removal hole against the flat area to remove the sleeve insert from the upper body.

10. The assembly of claim 9, wherein the at least one attachment member is a flange.

11. The assembly of claim 9, wherein the tubular member further comprises:

a sleeve wall extending between the first end and the second end and having an outer face opposing the upper body orifice;

the outer face having a circumferential groove therein; and the circumferential groove having a groove width and a groove depth sufficient size to accommodate the first sealing ring.

12. The assembly of claim 11, wherein the opening in the tubular member is an orifice through the sleeve wall having an orifice diameter sufficient to receive fluid from the side inlet channel.

13. The assembly of claim 9, wherein the tubular member of the sleeve insert further comprises:

a tapered section immediately adjacent to the second end of the tubular member providing a second end outer diameter smaller than the outer diameter of the tubular member immediately adjacent the tapered section that is distal the second end.

14. The assembly of claim 13, wherein the tubular member of the sleeve insert further comprises:

a frustoconical section immediately adjacent to the first end of the tubular member providing a first end outer diameter greater than the outer diameter of the tubular member immediately adjacent to the frustoconical section that is distal the first end and a first end inner diameter greater than the inner diameter of the tubular member immediately adjacent to the frustoconical section that is distal the first end; and the frustoconical section fitting within the upper body orifice.

15. The assembly of claim 9, further comprising:

an orienting pin extending from at least one of the at least one attachment member; and the upper body first end having an alignment hole therein in a position and of sufficient size to receive the orienting pin.

16. The assembly of claim 9, wherein the sleeve insert further comprises:

a wear-resistant coating applied to the tubular member.

\* \* \* \* \*